United States Patent [19]

Petit et al.

[11] Patent Number: 4,940,494
[45] Date of Patent: Jul. 10, 1990

[54] PROCESS AND EQUIPMENT FOR CLEANING LARGE ELECTROMECHANICAL PARTS

[75] Inventors: Nicaise Petit, Rousset; Jean-Claude Moisset, Faverges, both of France

[73] Assignees: Snef Electro Mecanique, Vitrolles; Techni Contact, Faverges, both of France

[21] Appl. No.: 708,512

[22] PCT Filed: Jul. 6, 1984

[86] PCT No.: PCT/FR84/00168
§ 371 Date: Mar. 5, 1985
§ 102(e) Date: Mar. 5, 1985

[30] Foreign Application Priority Data

Jul. 6, 1983 [FR] France .............. 83 401390

[51] Int. Cl.⁵ .......................... B08B 3/10
[52] U.S. Cl. .......................... 134/1; 134/10; 134/184
[58] Field of Search ............. 134/1, 10, 184

[56] References Cited

U.S. PATENT DOCUMENTS

| | | |
|---|---|---|
| 3,024,138 | 3/1962 | Schlott . |
| 3,105,779 | 10/1963 | Bulat . |
| 3,301,535 | 1/1967 | Brown ............... 134/184 X |
| 3,527,607 | 9/1970 | Antonevich ............. 134/1 |
| 3,529,998 | 9/1970 | Singer ............... 134/1 |
| 3,542,592 | 11/1970 | Zweig ............... 134/1 |
| 3,596,883 | 8/1971 | Brech ............... 134/184 X |
| 4,071,376 | 1/1978 | McNeer . |
| 4,382,824 | 5/1983 | Halleck ............... 134/1 |
| 4,409,999 | 10/1983 | Pedziwiatr ......... 134/184 X |

FOREIGN PATENT DOCUMENTS

| | | |
|---|---|---|
| 733470 | 2/1943 | Fed. Rep. of Germany . |
| 2008883 | 1/1970 | France . |
| 2032135 | 11/1970 | France . |
| 54-69260 | 6/1979 | Japan ............... 134/139 |
| 485035 | 3/1970 | Switzerland . |

OTHER PUBLICATIONS

European Search Report of EP 83 40 1390.
Preliminary Search Report of TS D 62079 FR 14644.

*Primary Examiner*—Frankie L. Stinson
*Attorney, Agent, or Firm*—Wegner & Bretschneider

[57] ABSTRACT

A simple and effective process allowing the cleaning of the part to be stopped at the required moment.

It consists in:
 placing the part inside a tank,
 introducing a solvent into the tank, until the part to be treated is totally submerged,
 subjecting the submerged part to low-frequency ultrasounds, for long enough to remove the soiling matter, then
 removing the cleaned part.

Application for cleaning rotors and stators of dynamo-electric machines.

9 Claims, 1 Drawing Sheet

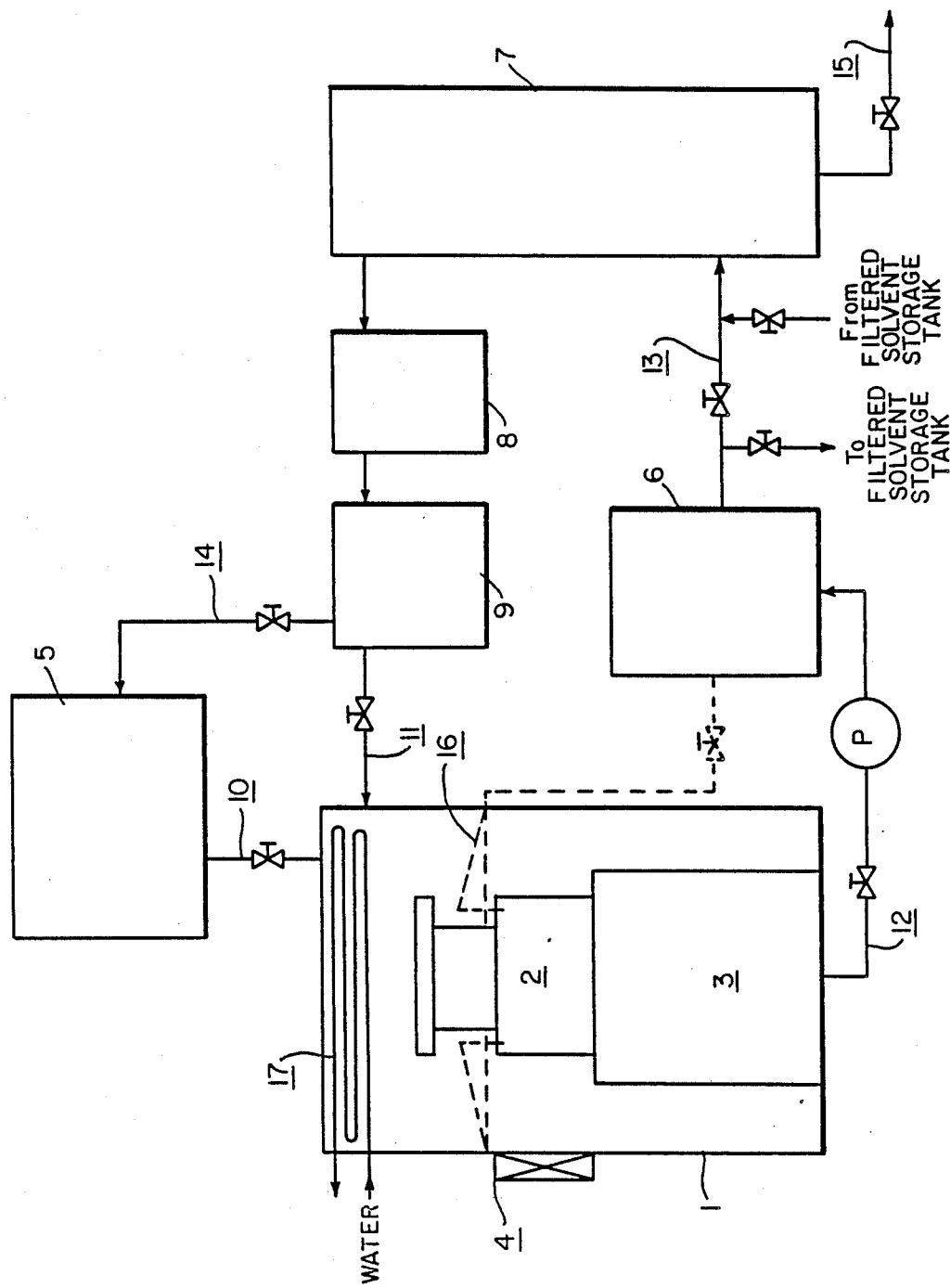

PROCESS AND EQUIPMENT FOR CLEANING LARGE ELECTROMECHANICAL PARTS

This invention concerns a process and equipment for cleaning large electrical or mechanical parts, such as rotors and stators of dynamoelectric machinery, or gas turbine rotors and automatic valves and for decontamination of electric motors in the nuclear power industry.

After a certain operating time, parts such as the rotors and stators of dynamoeletric machinery, become soiled with impurities such as carbon particles and greases and oils which accumulate on the part. This accumulation of impurities results in a reduction in the insulation value of the part and the machine must consequently be disassembled for cleaning of the part in order to restore its insulation level as far as possible and thus allow it to be re-used.

Several processes have in the past been used to clean this type of part.

One process consists in subjecting the soiled part to a jet of pressurized steam. Under the mechanical action of the steam, the soiling matter is unstuck and removed from the part. There are, however, many disadvantages inherent in this process. The action of the steam is often far from perfect and as it is not possible to determine the extent of the cleaning during the process itself, the effectiveness must be measured at the end of the cycle, which must then be repeated if the required level of cleanness is not reached. This kind of procedure is both time-consuming and expensive. In addition, as the steam humidifies the part treated, particularly the insulating material in the case of dynamo electric machine part, a 24-hour drying period, for example by oven-drying, must be included in the cleaning cycle. The insulation can then only be checked after this step of the operation. Drying, which represents an additional step in the process, is not only long and costly, but can also result in distortion of the part. For example, in the case of a dynamo-electric machine rotor, the action of heat can cause distortion of the slip-ring which must then be re-machined, thus adding still more to the time and the cost of the process.

Another process consists in using a pressurized solvent spray, such as a fluorocarbonated solvent which acts on the soiling matter both chemically and mechanically. This process also contains a significant number of disadvantages. As the solvent is under pressure, it is impossible constantly to monitor the degree of cleaning of the part. Consequently, the cleaning cycle must be completed, the part removed, the insulation checked and, if unsatisfactory, the cycle repeated. Furthermore, the absence of constant monitoring can mean that the cleaning process be run for an excessively long time, such that it may damage the parts, for example the insulators in the case of a dynamoelectric machine rotor. In addition, in the case of complex items, parts of which are not easily accessible, the pressurized solvent cannot effectively reach certain areas of the part, which are thus not cleaned, giving a part which is far from well cleaned.

The aim of the invention is thus to provide a fast, simple and effective process for cleaning soiled parts which avoids the previously mentioned drawbacks.

The aim of the invention is also to provide a fast, simple and effective process for cleaning soiled parts without the risk of damaging the part treated.

A further aim of the invention is to provide a fast, simple and effective process for cleaning soiled parts without the risk of damaging the part treated and which allows the cleaning to be halted at the required time, when the required level of cleaning has been reached.

The final aim of the invention is to provide the apparatus for implementing the process of the invention.

The invention provides a process for cleaning a soiled part which consists in submerging the part in a solvent and subjecting it to low-frequency ultrasounds. The simultaneous use of the solvent and the ultrasounds allows both dissolution of the materials which bond the soiling matter and mechanical removal of the latter without the risk of damaging any part of the item being cleaned.

The invention also provides a device for implementing the process.

The rest of the description refers to the single drawing appended, which represents an apparatus for implementing the invention.

Although the description refers to the rotor of a dynamoelectric machine, it is evident that the process of the invention can be applied to all similar parts such as dynamoelectric machine stators, gas turbine rotors, automatic valves and for decontamination of electric motors in the nuclear power industry After extended use, the rotors of dynamoelectric machines, and in particular of large dynamoelectric machines, become soiled with products such as carbon, grease and lubricants which accumulate on the rotor and in particular on the insulators of the windings. This accumulation of soiling matter results in a loss of insulation and after a certain time the motor has to be disassembled and the rotor cleaned in order to remove the soiling matting and restore the initial insulation level (insulation between windings and ground) or an insulation level which comes close to it.

The rotors of large dynamoelectric machines are large, complex parts, certain areas of which are not easily accessible.

According to the process of the invention, the rotor is placed on a support in a tank and is then submerged in an appropriate solvent. If required, the solvent may be heated to improve its effectiveness. The heating temperature depends on the solvent used and should not damage the part treated. The part submerged in the solvent is then subjected to low-frequency ultrasounds and the combined action of the solvent and the ultrasounds removes the soiling matter from the rotor.

The solvent plays several important roles in the process. It dissolves the bonding material of the solid soiling matter (greases, lubricants, etc.), acts as a propagation medium for the ultrasounds and as a reception and transportation medium for the solid soiling matter removed form the part. If necessary, the solvent may be filtered and distilled to remove any solid particles and dissolved impurities and then recycled in the invention process.

The cleaning time is variable and depends on the part treated, the solvent and the level of ultrasounds used. In general, satisfactory results are obtained for a treatment time of between 10 and 30 minutes or more. In a recommended process configuration, for the rotor of a dynamoelectric machine, the insulation values between the windings and the ground may be constantly monitored by means of any appropriate measuring apparatus and the cleaning cycle can then be stopped when the insulation value measured is equal or close to the initial rated value.

For the purposes of this process, one may use any appropriate conventional solvent which dissolves grease, oil and lubricants and does not attack the treated part. For example, hydrocarbons, halogenated hydrocarbons, soaps, detergents, esters, ketones, etc. may be used as the solvent. We would especially recommend using fluorinated hydrocarbons, particularly a fluoro containing halogenated hydrocarbon such as FREON ® as the solvent.

The ultrasounds used must be low-frequency and will generally be between 18 and 25 kHz, and in particular between 18 and 20 kHz. Ultrasounds with a frequency higher than 20 kHz do not have sufficient energy to pass through large parts such as the rotors of large dynamoelectric machines and a frequency of less than 18 kHz would be difficult to use. We recommend using ultrasounds of magnetostrictive origin.

If necessary, the solvent may be circulated to facilitate removal of solid particles and ensure better penetration of the solvent inside the part to be cleaned.

The process may be either discontinuous or continuous. In the case of a discontinuous process, at the end of the cleaning cycle, the solvent can be drained, filtered, distilled and stored for future use. In the case of a continuous process, solvent is continuously drawn off from the tank, filtered, distilled and returned to a storage tank. At the same time, the level of solvent in the tank is maintained by feeding in fresh solvent from the storage tank.

Using a configuration recommended for the invention, the part to be treated is placed on a support in the treatement tank, solvent, e.g., FREON ® is introduced into the tank until it totally covers the part. The solvent is then heated to about 30° C. and low-frequency ultrasounds at 20 kHz are applied in the area of the part to be treated for about 10 to 30 minutes. Once the treatment is completed, the solvent is drawn off and stored for re-use after filtering and distillation and the clean part is removed from the tank.

The figure shows a device for implementing the process of the invention. The device comprises cleaning tank containing support 3, on which the part to be cleaned is placed and, as an example, rotor 2 of a large dynamoelectric machine.

Located on the outside of the tank, in the area of the part to be treated, is a low-frequency ultrasound generating device. In the assembly shown, this device comprises 4 magnetostrictive transducers (4) laid out symmetrically two-by-two and connected to four ultrasound generators (not shown). The number of transducers may vary widely and more or less transducers can be used as required.

The solvent is introduced into the tank through pipe 10 from fresh solvent storage tank 5 or by pipe 11 from a solvent recycling apparatus described below.

The solvent used is drawn off through pipe 12 and sent via pump P to filter 6 which removes the solid particles. This filtered solvent may then be either returned to a filtered solvent storage tank (not shown), or sent through a pipe to distillation unit 7 where it is distilled. The distillate condensed in condenser 8 is sent by recycling device 9 (such as a pump) either to storage tank 5 through pipe 14 or directly to treatment tank 1 via pipe 11 and the distillation residue is evacuated through pipe 15.

The apparatus may comprise optional device 16 (shown on the figure by a broken line) consisting of pipes and nozzles designed to inject solvent inside the part. Injector 16 may be directly connected to an outlet of filter 6.

A heating device may also be provided (not shown). It could, for example, consist of flat heating resistors located around the tank in the area of the part to be treated, as well as a solvent vapor condenser, such as water coil 17, at the top of the tank, to condense the solvent vapors.

EXAMPLE

We measured the insulation value (windings-ground) of a dirty rotor from a dynamoelectric machine and obtained a value of 150,000 ohms. The rotor was then placed on base 3 in tank 1. From storage tank 5, we introduced the fluoro containing halogenated hydrocarbon FREON ® until the rotor was submerged. The FREON ® was then heated to about 30° C. by means of the heating resistors. We then condensed the FREON ® vapors by passing water through the tank coil.

The ultrasound generating device comprised the magnetostrictive transducer and had an rms power of 1400 W and supplied ultrasounds at a frequency of 20 kHz.

The part inside the tank was subjected to the combined action of the solvent and the ultrasounds for half an hour. We constantly measured the value of the insulation. After 10 minutes of treatment, the value of the insulation reached 35 megohms and, after half an hour, reached 100 megohms, i.e., a value virtually equivalent to the initial insulation value of the rotor when new. The tank was then drained and the rotor taken out.

We filtered the solvent and then distilled and stored it for future use.

We claim:

1. A process for cleaning a large and complex part soiled with carbon particles, greases and lubricants, comprising the steps of;
   placing the part inside a tank,
   introducing solvent into the tank until the part to be treated is completely submerged,
   subjecting the submerged part to a magnetostrictive ultrasonic energy having a low frequency within the range of 18 to 25 kHz for a sufficient period of time to remove the soiling matter, and
   removing the cleaned part.

2. A process as claimed in claim 1, wherein the solvent is a fluoro containing halogenated hydrocarbon.

3. A process as claimed in claim 2, wherein the FREON ® fluoro containing halogenated hydrocarbon is heated to a temperature of about 30° C.

4. A process as claimed in claim 1, wherein the frequency of the ultrasounds used is between 18 and 20 kHz.

5. A process as claimed in claim 1, wherein the treatment time is between 10 minutes and 30 minutes inclusive.

6. A process as claimed in claim 1, wherein the solvent is filtered, distilled and recycled in the treatment tank, or stored for future re-use.

7. A process as claimed in claim 1, wherein some of the solvent is injected under pressure into the part to be cleaned.

8. Apparatus for the implementation of the process as per claim 1, comprising: a treatment tank comprising a support for the part to be treated, a device for introducing a solvent into the tank and a device for generating a magnetostrictive ultrasonic energy having a frequency within the range of 18 to 25 kHz, said device for generating comprising at least one magnostrictive transducer placed on the external wall of the tank in the area of the part to be treated and an ultrasound generator connected to the transducer.

9. A process for cleaning a soiled rotor of a dynamoelectric machine, the insulating resistance of the soiled rotor between the windings and the ground being significantly lower than its rated value, comprising the steps of:

placing the rotor on a support in a treatment tank,
introducing a fluoro containing halogenated hydrocarbon into the tank until the rotor is submerged,
heating the fluoro containing halogenated hydrocarbon to a temperature of about 30° C.,
applying a magnetostrictive ultrasonic energy having a frequency of about 20 kHz, while continuously measuring the value of the rotor insulation resistance,
stopping the application of the ultrasonic energy when the insulation resistance measured reaches a value equal or close to its rated value, and
removing the rotor from the tank.

* * * * *